(12) United States Patent
Chen

(10) Patent No.: US 8,571,503 B2
(45) Date of Patent: Oct. 29, 2013

(54) SIGNAL RECEIVING METHODS AND DEVICES

(75) Inventor: Junqin Chen, Taipei County (TW)

(73) Assignee: Mitac International Corp., Taoyuan (TW)

( * ) Notice: Subject to any disclaimer, the term of this patent is extended or adjusted under 35 U.S.C. 154(b) by 907 days.

(21) Appl. No.: 12/718,605

(22) Filed: Mar. 5, 2010

(65) Prior Publication Data

US 2011/0216248 A1 Sep. 8, 2011

(51) Int. Cl.
*H04B 1/18* (2006.01)
*H04B 1/04* (2006.01)

(52) U.S. Cl.
USPC ........................................ 455/193.1; 455/121

(58) Field of Classification Search
USPC ............. 455/518, 74.1, 120, 121, 552.1, 130, 455/168.1, 154.1, 176.1, 160.1, 178.1, 455/193.1, 180.1, 180.2, 277.1
See application file for complete search history.

(56) References Cited

U.S. PATENT DOCUMENTS

| | | | |
|---|---|---|---|
| 4,896,362 A | 1/1990 | Veldhuis et al. | |
| 5,606,618 A | 2/1997 | Lokhoff et al. | |
| 5,699,484 A | 12/1997 | Davis | |
| 6,226,306 B1 | 5/2001 | Yajima et al. | |
| 6,686,830 B1 | 2/2004 | Schirtzer | |
| 2009/0322632 A1* | 12/2009 | Milosevic | 343/723 |
| 2010/0001908 A1* | 1/2010 | Chen | 343/700 MS |

* cited by examiner

*Primary Examiner* — Ping Hsieh
*Assistant Examiner* — Xin Jia
(74) *Attorney, Agent, or Firm* — Birch, Stewart, Kolasch & Birch, LLP

(57) ABSTRACT

A signal receiving method for receiving a signal within a predetermined bandwidth for a broadcasting system using an embedded antenna is provided, comprising: obtaining an antenna bandwidth of the embedded antenna; dividing the predetermined bandwidth into a plurality of subbands according to the antenna bandwidth; receiving a control signal; selecting one of the subbands according to the control signal; and receiving the signal using a match unit corresponding to the selected subband for matching the embedded antenna.

18 Claims, 3 Drawing Sheets

SIGNAL RECEIVING METHODS AND DEVICES

BACKGROUND OF THE INVENTION

1. Field of the Invention

The invention relates to overcome narrow bandwidth embedded antenna problem, and more particularly, to methods and antenna modules in combinative application of embedded antenna and systems which have the relatively large bandwidth, applied in Digital Video Broadcasting-Terrestrial (DVB-T) systems.

2. Description of the Related Art

As is known, it is planned that the transmission of broadcast radio and television signals will be changed completely from the analogue standard to the digital standard by 2010 at the latest. Transmissions will then be based on the Digital Video Broadcasting (DVB) Standard, which is suitable for digital reception of video and audio data via satellite, via cable or via terrestrially transmitted programs. The expressions DVB-S (for satellite reception), DVB-C (for cable reception) and DVB-T when the signals are transmitted terrestrially are used in a corresponding manner.

This DVB-T system transmits compressed digital audio, video and other data in an MPEG transport stream, using COFDM modulation. In the case of DVB-T, there are two choices for the number of carriers known as 2K-mode or 8K-mode. In addition, the bandwidth of DVB-T system is 430 MHz (from 470~870 MHz). DVB-T system provides a wide operating bandwidth.

There is a general trend towards miniaturisation of portable electronic devices, including portable wireless devices. As a result, antennas compete for space with the other device components (e.g. battery, display, keypad, printed circuit board). An embedded antenna is used in the DVB-T product because the embedded antenna in size is relatively small. However, the embedded antenna bandwidth is quite narrow. For example, the embedded antenna bandwidth is above 120 MHz. The embedded antenna bandwidth is not enough wide such that the embedded antenna is not suited to use in the relatively large bandwidth system such like DVB-T system or other systems which have the relatively large bandwidth. The direct combination of embedded antenna and systems which have the relatively large bandwidth cause the system performance becomes worse.

BRIEF SUMMARY OF THE INVENTION

One objective of the invention is to provide a signal receiving method for receiving a signal within a predetermined bandwidth for a broadcasting system using an embedded antenna, comprising: obtaining an antenna bandwidth of the embedded antenna; dividing the predetermined bandwidth into a plurality of subbands according to the antenna bandwidth; receiving a control signal; selecting one of the subbands according to the control signal; and receiving the signal using a match unit corresponding to the selected subband for matching the embedded antenna.

Another objective of the invention is to provide a signal receiving device for a broadcasting system, comprising: an embedded antenna for receiving a signal within a predetermined bandwidth; and a match device comprising a plurality of match units, selectively coupling one of the match units to the embedded antenna according to a control signal, and receiving the signal through the match unit coupled to the embedded antenna, wherein the match units are respectively corresponding to different subbands.

The invention provides methods and devices to improve the shortcomings in the direct combination of embedded antenna and systems which have the relatively large bandwidth. It would be desirable to provide an embedded antenna which, physically, is relatively small while satisfying the systems which have the relatively large bandwidth.

The advantage and spirit of the invention could be better understood by the following recitations together with the appended drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
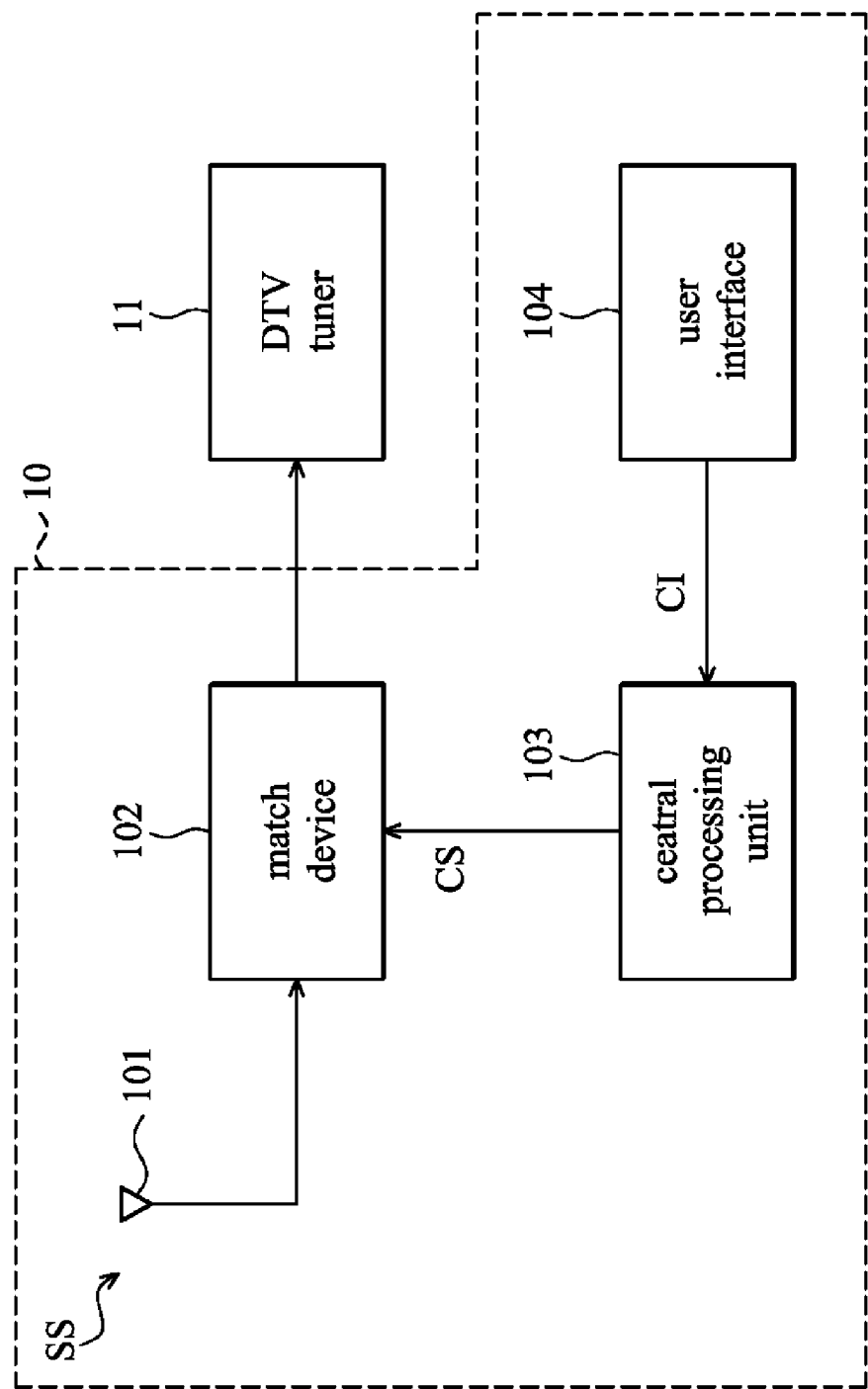
FIG. 1 is a block diagram illustrating a signal receiving device 10 for a digital video broadcasting-terrestrial (DVB-T) system according to an embodiment of the invention.

FIG. 1 is a block diagram illustrating a signal receiving device 10 for a digital video broadcasting-terrestrial (DVB-T) system according to an embodiment of the invention. The signal receiving device 10 comprises an internal embedded antenna 101, a match device 102, a central processing unit 103 and a user interface 104. The internal embedded antenna 101 receives a signal SS within a predetermined bandwidth, wherein the predetermined bandwidth is from 470 MHz to 870 MHz for a digital video broadcasting-terrestrial (DVB-T) system. Furthermore, the antenna bandwidth of the internal embedded antenna 101 is 120 MHz. The antenna bandwidth is much smaller than the predetermined bandwidth of DVB-T system such that the internal embedded antenna can not cover all the predetermined bandwidth. To solve this problem, an embodiment of the invention provides the match device 102.

The match device 102 can comprise a plurality of match units and a plurality of switches. The match device 102 selectively couples one of the match units to the internal embedded antenna 101 and couples the match unit which couples to the embedded antenna to a digital television (DTV) tuner 11 according to a control signal CS from a central processing unit 103, and receives the signal SS through the match unit coupled to the embedded antenna, wherein the match units are respectively corresponding to different subbands and the subbands are obtained by dividing the predetermined bandwidth according to the antenna bandwidth, wherein the subbands are non-overlap. Therefore, the amount of the match units is the same with the amount of the subbands.

The match device 102 can comprise a plurality of match units and a plurality of switches. The match device 102 selectively couples one of the match units to the internal embedded antenna 101 and couples the match unit which couples to the embedded antenna to a digital television (DTV) tuner 11 according to a control signal CS from a central processing unit 103, and receives the signal SS through the match unit coupled to the embedded antenna, wherein the match units are respectively corresponding to different subbands and the subbands are obtained by dividing the predetermined bandwidth according to the antenna bandwidth, wherein the subbands are non-overlap. Therefore, the amount of the match units is the same with the amount of the subbands.

A user controls the user interface 104 to select a desired DTV channel. The user interface 104 generates the channel information CI according to the channel selected by a user. The central processing unit 103 then generates the general purpose input/output control signal CS according to channel information CI from the user interface 104. For example, a user selects the channel 68 such as HBO by controlling the user interface 104. The central processing unit 103 will check a DTV channel table according to channel information to find out a subband corresponding to the channel 68. The central processing unit 103 transmits the general purpose input/output control signal CS which comprises information about the subband corresponding to the channel 68 to the match device 102 in order to indicate the match device 102 to switch the right subband corresponding to the channel 68.

Figure 2:
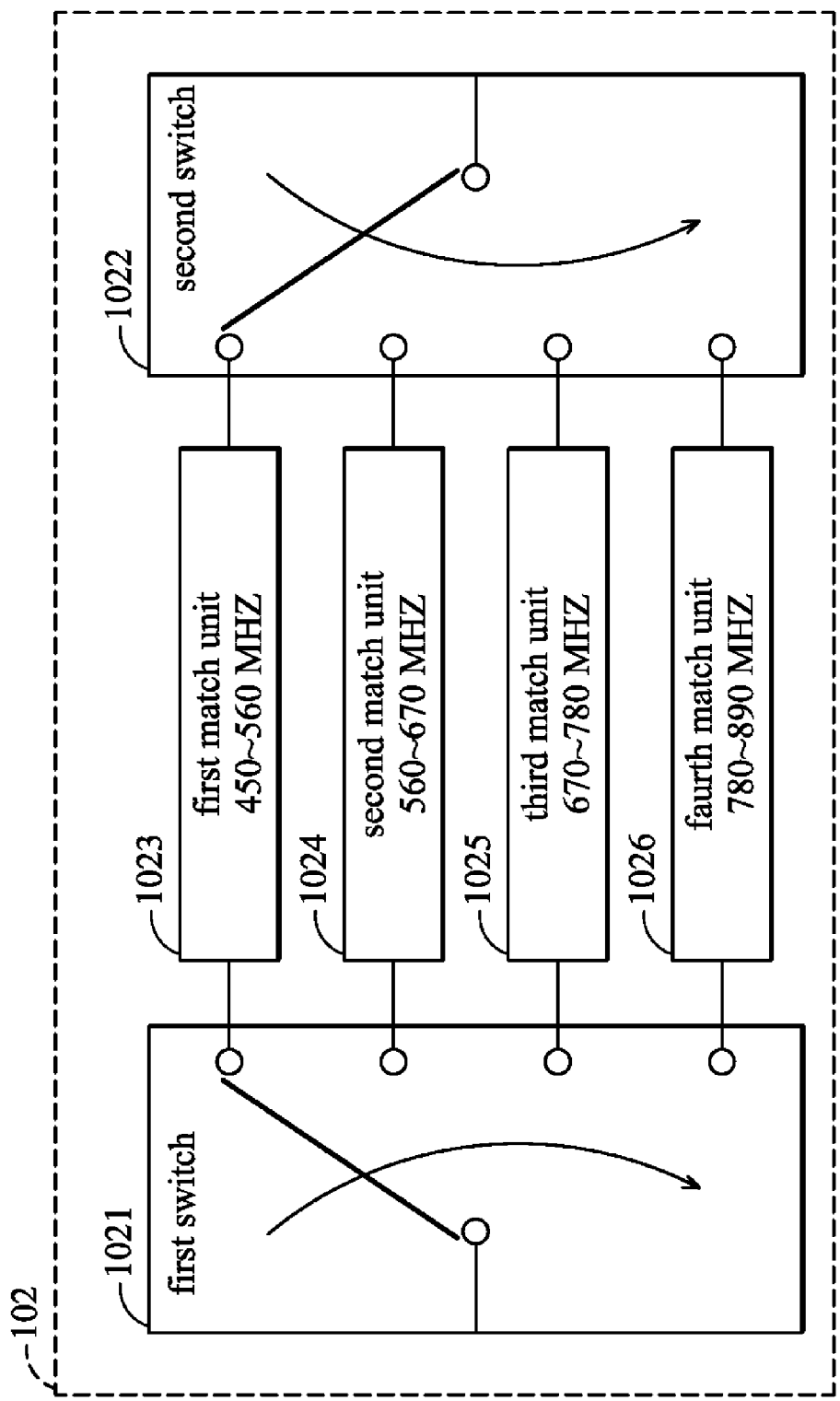
FIG. 2 is a block diagram illustrating the match device 102 for a digital video broadcasting-terrestrial (DVB-T) system according to an embodiment of the invention.

FIG. 2 is a block diagram illustrating the match device 102 for a digital video broadcasting-terrestrial (DVB-T) system according to an embodiment of the invention. The match device 102 comprises a first switch 1021, a second switch 1021 and a plurality of match units. Since the amount of the match units or the subband of the match units is obtained by dividing the predetermined bandwidth according to the antenna bandwidth, the amount of the match units equals to four and the antenna bandwidth is 120 MHz when the predetermined bandwidth of the DVB-T system is 430 MHz.

Therefore, in this example, the match device 102 comprises a first match unit 1023, a second match unit 1024, a third match unit 1025 and a fourth match unit 1026, wherein a first subband corresponding to the first match unit 1023 is from 450 MHz to 560 MHz, a second subband corresponding to the second match 1024 unit is from 560 MHz to 670 MHz, a third subband corresponding to the third match unit 1025 is from 670 MHz to 780 MHz and a fourth subband corresponding to the fourth match unit 1026 is from 780 MHz to 890 MHz as shown in the FIG. 2, wherein the first subband, the second subband, the third subband and the fourth subband are non-overlap.

The match device 102 controls the first switch 1021 to selectively couple one of the match units to the internal embedded antenna 101 and controls the second switch 1022 to couple the match unit which couples to the internal embedded antenna 101 to a digital television (DTV) tuner 11 according to the general purpose input/output control signal CS from the central processing unit 103. In other word, the first switch 1021 couples the selected match unit to the internal embedded antenna 101 according to the control signal and the second switch 1022 couples the selected match unit to the DTV tuner 11 synchronously.

For example, as shown in the FIG. 2, the central processing unit 103 transmits the general purpose input/output control signal CS which comprises information about the selected subband corresponding to the channel 68 to the match device 102 in order to indicate the match device 102 to switch the third subband corresponding to the channel 68. The first switch 1021 and the second switch 1022 then switch to the third match unit 1025 synchronously. Therefore, the first switch 1021 and the second switch 1022 enable the third match unit 1025 couple to the internal embedded antenna 101 and DTV tuner 11. Moreover, the first switch 1021 and the second switch 1022 couple to the four match units such that the first switch 1021 is a single pole four throw (SP4T) switch and the second switch 1022 is also a single pole four throw (SP4T) switch. Therefore, if the first switch 1021 and the second switch 1022 couple to the six match units, the first switch 1021 and the second switch 1022 should be single pole six throw (SP6T) switches, and so on. Since the internal embedded antenna can not cover all the predetermined bandwidth, the invention solves this problem by only using the match device 102 comprising the switches and the match units.

Figure 3:
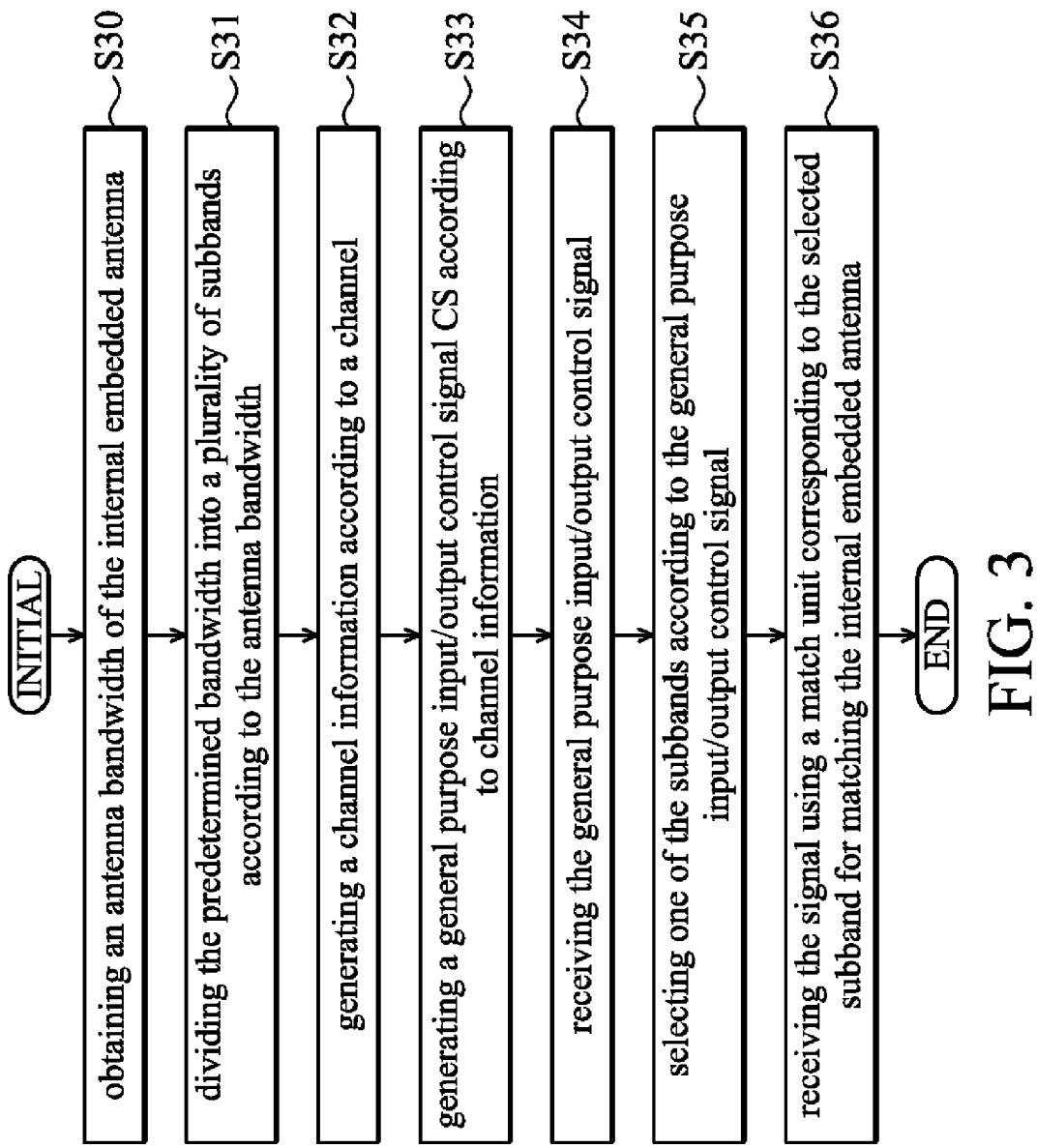
FIG. 3 is a flow chat illustrating a signal receiving method 3 for receiving a signal within a predetermined bandwidth for a digital video broadcasting-terrestrial (DVB-T) system using an embedded antenna according to an embodiment of the invention.

FIG. 3 is a flow chat illustrating a signal receiving method 3 for receiving a signal within a predetermined bandwidth for a digital video broadcasting-terrestrial (DVB-T) system using an embedded antenna according to an embodiment of the invention. The signal receiving method 3 comprises obtaining an antenna bandwidth of the internal embedded antenna 101 in the step S30; dividing the predetermined bandwidth of DVB-T system into a plurality of subbands according to the antenna bandwidth in the step S31; generating a channel information CI according to a channel selected by a user in the step S32; generating a general purpose input/output control signal CS according to channel information CI received from a user interface 104 by the control central processing unit 103 in the step S33; in the step S34, receiving the general purpose input/output control signal CS from the central processing unit 103; selecting one of the subbands according to the general purpose input/output control signal CS in the step S35; and in the step S36, receiving the signal using a match unit corresponding to the selected subband for matching the internal embedded antenna 101. Then the flow chat ends.

For example, an antenna bandwidth of the internal embedded antenna 101 and the predetermined bandwidth of DVB-T system are obtained. The antenna bandwidth is 120 MHz and the predetermined bandwidth is 430 MHz. The predetermined bandwidth of DVB-T system is divided into a plurality of subbands according to the antenna bandwidth. Therefore, the amount of the subbands equals to the round(430/120)+1. There are four subbands. The channel information CI is generated according to a channel selected by a user and then the general purpose input/output control signal CS is generated according to channel information CI by the control central processing unit 103. The general purpose input/output control signal CS is received by the match device 102. The match device 102 will select one of the subbands according to the general purpose input/output control signal CS. The signal SS is received by using a match unit corresponding to the selected subband for matching the internal embedded antenna 101.

With the example and explanations above, the features and spirit of the invention are hopefully well described. Those skilled in the art will readily observe that numerous modifications and alterations of the embodiments may be made while retaining the teachings of the invention. Accordingly, the above disclosure should be construed as limited only by the metes and bounds of the appended claims.

What is claimed is:

1. A signal receiving method for receiving a signal within a predetermined bandwidth for a broadcasting system using an embedded antenna, comprising:
obtaining an antenna bandwidth of the embedded antenna;
dividing the predetermined bandwidth into a plurality of subbands according to the antenna bandwidth, wherein the amount of the subbands equals to the round(x/y)+1 when (x/y) does not equal an integer, and the amount of the subbands equals to the round (x/y) when (x/y) equals an integer, wherein the parameter x represents the predetermined bandwidth and the parameter y represents the antenna bandwidth of the embedded antenna, and the subbands are non-overlap;

receiving a control signal;

selecting one of the subbands according to the control signal; and receiving the signal using a match unit corresponding to the selected subband for matching the embedded antenna.

2. The signal receiving method of claim 1, wherein the broadcasting system is a digital video broadcasting-terrestrial (DVB-T) system.

3. The signal receiving method of claim 1, wherein the broadcasting system is a digital video broadcasting-terrestrial (DVB-T) system.

4. The signal receiving method of claim 1, further comprising:

generating the control signal according to channel information received from a user interface by a control central processing unit.

5. The signal receiving method of claim 4, further comprising:

generating the channel information according to a channel selected by a user.

6. The signal receiving method of claim 3, wherein the amount of the subbands equals to 4 and the antenna bandwidth is 120 MHz when the predetermined bandwidth is 430 MHz.

7. The signal receiving device of claim 1, wherein the amount of the match units equals to four and the antenna bandwidth is 120 MHz when the predetermined bandwidth is 430 MHz.

8. The signal receiving device of claim 7, wherein the match device comprises a first match unit, a second match unit, a third match unit and a fourth match unit, wherein a first subband corresponding to the first match unit is from 450 MHz to 560 MHz, a second subband corresponding to the second match unit is from 560 MHz to 670 MHz, a third subband corresponding to the third match unit is from 670 MHz to 780 MHz and a fourth subband corresponding to the fourth match unit is from 780 MHz to 890 MHz.

9. A signal receiving device for a broadcasting system, comprising:

an embedded antenna for receiving a signal within a predetermined bandwidth; and a match device comprising a plurality of match units, selectively coupling one of the match units to the embedded antenna according to a control signal, and receiving the signal through the match unit coupled to the embedded antenna, wherein the match units are respectively corresponding to different subbands, wherein the amount of the match units equals to the round(x/y)+1 when (x/y) does not equal an integer and the amount of the match units equals to the round(x/y) when (x/y) equals an integer, wherein the parameter x represents the predetermined bandwidth and the parameter y represents the antenna bandwidth of the embedded antenna, and the subbands are non-overlap.

10. The signal receiving device of claim 9, wherein the subbands are obtained by dividing the predetermined bandwidth according to the antenna bandwidth.

11. The signal receiving device of claim 9, wherein the broadcasting system is digital video broadcasting-terrestrial (DVB-T) system.

12. The signal receiving device of claim 9, wherein the predetermined bandwidth is from 470 MHz to 870 MHz.

13. The signal receiving device of claim 9, further comprising a central processing unit for generating the control signal according to channel information from a user interface.

14. The signal receiving device of claim 9, further comprising the user interface for generating the channel information according to a channel selected by a user.

15. The signal receiving device of claim 9, wherein the match unit comprises a first switch for coupling the selected match unit to the embedded antenna according to the control signal.

16. The signal receiving device of claim 9, wherein the match unit further comprises a second switch for coupling the selected match unit to a tuner.

17. The signal receiving device of claim 15, wherein the first switch is a single pole four throw (SP4T) switch.

18. The signal receiving device of claim 16, wherein the second switch is a single pole four throw (SP4T) switch.

* * * * *